June 1, 1965　　　L. J. FISCHER　　　3,186,491
HELICOPTER DRIVE SYSTEM UTILIZING TIP MOUNTED FANS
Filed March 17, 1964　　　2 Sheets-Sheet 1
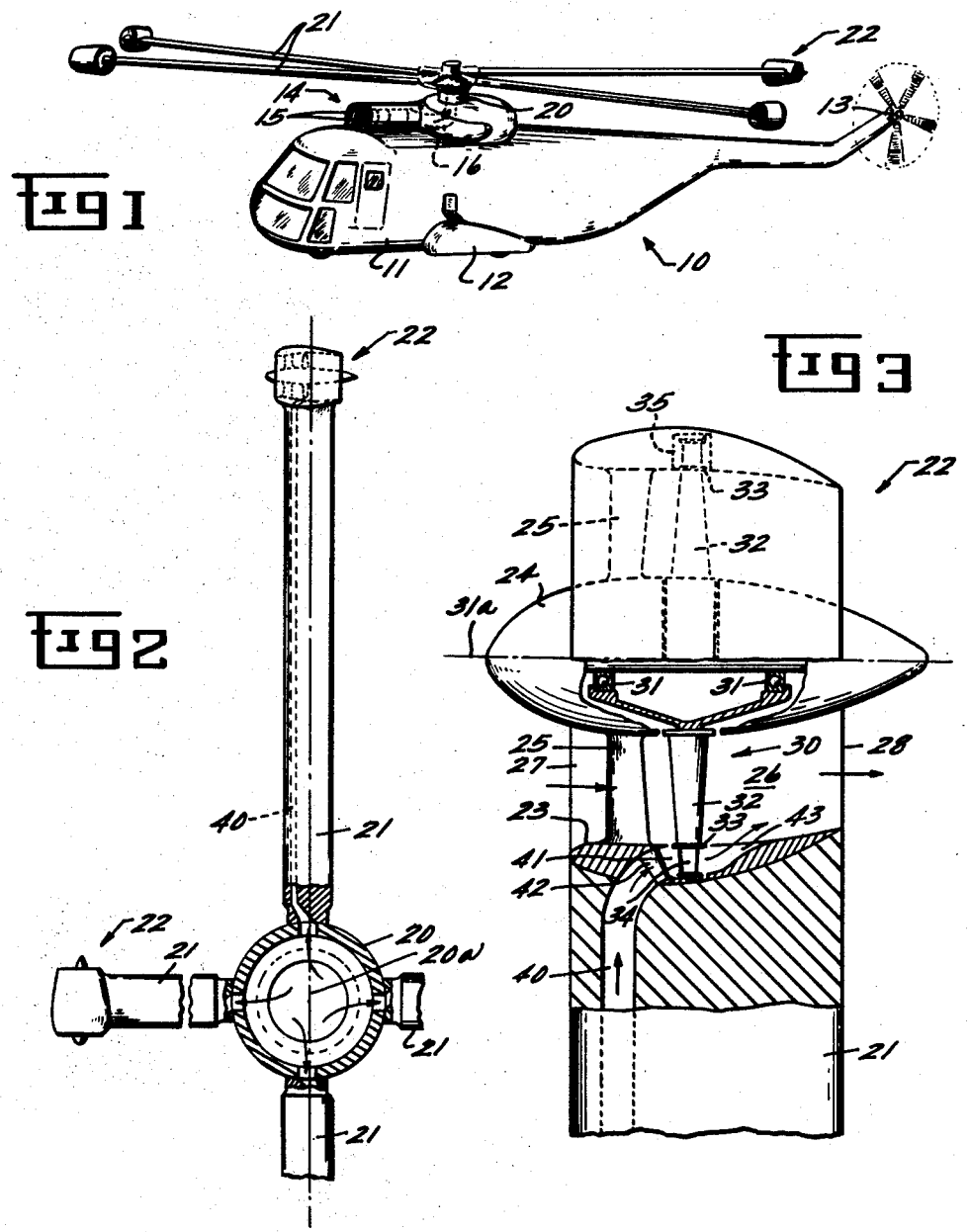
INVENTOR.
LEE J. FISCHER
BY
George R. Powers
ATTORNEY- June 1, 1965 L. J. FISCHER 3,186,491
HELICOPTER DRIVE SYSTEM UTILIZING TIP MOUNTED FANS
Filed March 17, 1964 2 Sheets-Sheet 2

INVENTOR.
LEE J. FISCHER
BY
George R. Powers
ATTORNEY—

United States Patent Office

3,186,491
Patented June 1, 1965

3,186,491
HELICOPTER DRIVE SYSTEM UTILIZING TIP MOUNTED FANS
Lee Joseph Fischer, Marblehead, Mass., assignor to General Electric Company, a corporation of New York
Filed Mar. 17, 1964, Ser. No. 352,569
1 Claim. (Cl. 170—135.4)

This invention relates to a drive system for helicopters and, more particularly, to a gas-coupled drive system in which fans mounted on the blade tips of a helicopter rotor are driven by gas supplied from fuselage mounted gas generators.

The rotors of helicopters are commonly driven through suitable gearing by an engine located within or on the fuselage of the helicopter. The power transmission equipment in such geared arrangements represents a substantial portion of the weight, complexity, initial cost, and maintenance expense of the helicopter. Therefore, in order to reduce the weight, complexity, and expense of helicopters and in order to eliminate the necessity of transmitting high levels of torque through the rotor hub, it has been proposed in the past that helicopters be driven by propulsion jets on the outer tips of the rotor blades rather than through conventional gearboxes. It has, for example, been proposed that a gas generator mounted in the fuselage supply either high pressure products of combustion or high pressure compressed air through the rotor hub and outwardly through the rotor blades to nozzles located on the blade tips, the fluid then being discharged through nozzles as propulsion jets to drive the rotor. In order to deliver a sufficient quantity of the fluid through the thin, aerodynamically shaped rotor blades to the nozzles, the fluid must be supplied at high pressure. As a result, the fluid is discharged from the nozzle at a high jet velocity. An alternative approach has been to mount complete ramjet engines on the outer tips of the rotor blades, the ramjet engines drawing in ambient air to support the combustion process and discharging high velocity streams of exhaust fluid.

It is well known, however, that a drive system using propulsion jets achieves its maximum propulsive efficiency when the speed of the blade tips approaches as nearly as possible the velocities of the jets relative to the tips. Under such conditions, relatively little excess energy is dissipated in the atmosphere since the propulsion fluid is discharged with low absolute velocity. As a practical matter, however, the speed of helicopter blade tips does not approach the speed of such high velocity propulsion jets. Consequently, under most operating conditions, the propulsive efficiency of such drive systems is relatively low.

To provide higher propulsive efficiency, it has been proposed that complete turbojet engines designed to produce relatively low velocity jet streams be mounted on the outer tips of the rotor blades. While the lower jet velocity thus provides a higher propulsive efficiency, the internal thermodynamic cycle efficiency of such an engine is typically quite low since it is by necessity a low pressure ratio, low temperature machine. In addition to the adverse effect on the thermodynamic efficiency, this approach concentrates the weight of the propulsion apparatus at the tips of the rotor blades. As a result, various complications may arise because of the high centrifugal and gyroscopic force fields thus created at the rotor blade tips.

Accordingly, it is a primary object of this invention to provide for helicopters an improved drive system not subject to the deficiencies described above.

Another object of this invention is to provide for helicopters a drive system having relatively high propulsive efficiency.

Yet another object is to provide for helicopters an improved drive system characterized by both relatively high propulsive efficiency and high thermodynamic cycle efficiency.

A further object of this invention is to provide for helicopters a drive system of the propulsion jet type in which the propulsion jets are discharged with relatively low absolute velocity.

A still further object of this invention is to provide an uncomplicated, dependable drive system which is relatively lightweight and not subject to excessively large centrifugal and gyroscopic force fields.

Briefly stated, in accordance with an illustrated embodiment of this invention, a helicopter is provided with fans mounted at the outer tips of the rotor blades. These fans are preferably of the tip turbine type, an arrangement in which a row of turbine buckets is peripherally mounted on the outer tips of a row of compressor blades, the entire assembly being rotatably mounted. The fans are driven by high temperature, high pressure products of combustion produced by a thermodynamically efficient gas generator mounted on the helicopter fuselage and supplied to the row of turbine buckets through suitable ducts in the rotor hub and in the rotor blades. In operation, the fan arrangement extracts energy, and consequently velocity, from the products of combustion and uses the extracted energy to accelerate ambient air drawn into the fan, or compressor portion, of the tip turbine fan assembly. A composite stream comprised of both the decelerated products of combustion and the accelerated ambient air is utilized as a propulsion jet, the low velocity jet stream thus providing a relatively high propulsive efficiency.

While the invention is distinctly claimed and particularly pointed out in the claim appended hereto, the invention, both as to organization and content, will be better understood and appreciated, along with other objects and features thereof, from the following detailed description when taken in conjunction with the drawing, in which:

FIG. 1 is a pictorial view of a helicopter incorporating one embodiment of this invention;

FIG. 2 is a fragmentary view, partially in cross-section, of the rotor assembly shown in FIG. 1;

FIG. 3 is an enlarged view showing in cross-section one of the tip turbine fan arrangements of this invention mounted on the outer tip of one of the blades of the rotor assembly of FIG. 3;

Figure 4:
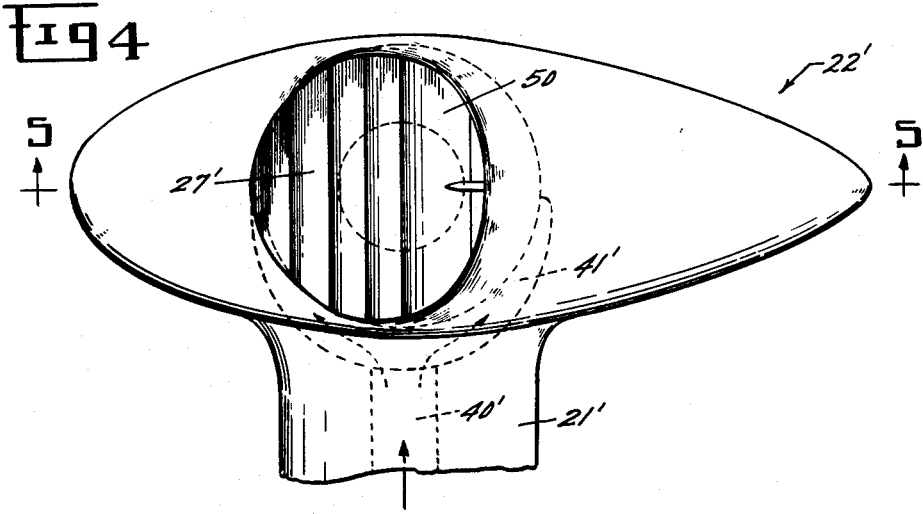
FIG. 4 is a view similar to FIG. 2 showing a second embodiment of this invention.

Referring to FIG. 1, a helicopter indicated generally by the numeral 10 is illustrated, the helicopter 10 having a fuselage 11, a landing gear assembly 12, and a tail rotor assembly 13. These elements are typical of those well-known in the helicopter art and, except as being necessary components of a fully operative helicopter, do not form part of the present invention.

Two gas generators 14 are mounted on the upper portion of the fuselage 11. The gas generators 14 are essentially gas turbine engines of the well-known turbojet type, a detailed description of the inner construction and operation of the gas generators therefore being unnecessary at this point. It is pointed out, however, that the gas generators are preferably high pressure ratio, high temperature machines having high thermodynamic cycle efficiencies. The gas generators 14 draw in ambient air through inlet openings 15 and discharge high energy products of combustion into an exhaust duct 16, the duct 16 directing the combustion products into the interior of the helicopter rotor hub 20 as illustrated by the arrows. As best shown by FIG. 2, the hollow rotor hub 20 is of the "solid hub" type and has rotor blades 21 fixed thereto. As this description proceeds, it will occur to those skilled in the art that the invention is equally applicable to "articulated" rotor assemblies in which the rotor blades are hinged to the hub, usually so as to allow both flapping and lagging motions, rather than being solidly connected. It will also occur to those skilled in the art that a portion of the gases produced by the gas generators 14 can be used to produce forward thrust rather than to drive the rotor assembly.

Referring now to FIGS. 2 and 3, the rotor assembly is illustrated in greater detail. Each of the rotor blades 21 has at its outer tip a turbomachine or fan assembly indicated generally by the numeral 22. The fan assembly 22 includes a hollow annular casing 23 and an elongated hub 24 concentrically supported within the annular casing 23 by a plurality of radial support struts 25, the hub 24 extending axially beyond both ends of the casing 23. The annular casing 23 and the hub 24 cooperate to define therebetween an axial passageway 26 including an inlet opening 27 and an exhaust nozzle 28 at opposite ends thereof. The rotor of a single stage fan 30 is rotatably mounted on the hub 24 by suitable bearings 31 for rotation about an axis 31a, the axial spacing between the bearings 31 being as great as practicable so that the gyroscopic torques experienced during helicopter operation can be absorbed without exerting excessive forces on the bearings 31. These gyroscopic forces will be discussed in greater detail at a later point in this description.

The single stage fan 30 has a compressor portion comprising a plurality of radial compressor blades 32 spanning the passageway 26. The outer tips of the compressor blades 32 are joined by a circumferential shroud 33, and a turbine portion comprising a plurality of radial turbine buckets 34 which are mounted on the shroud 33 extends outwardly of the compressor portion. The turbine buckets 34 project into an annular groove 35 in the casing 23. The fan arrangement just described is commonly referred to as being of the "tip turbine" type.

With reference still being directed to FIGS. 2 and 3, communication means is provided for supplying gas produced by the gas generators 14 to the turbine portion of the fan assembly 22, the communication means including passages 40 in the rotor blades 21 which connect the hollow interior of the solid rotor hub 20 to the annular groove 35 in each of the casings 23. More particularly, the passages 40 supply high pressure products of combustion to nozzle boxes 41 which are aligned with at least a portion of the annular grooves 35. The vanes 42 of the nozzle boxes 41 direct the combustion products to the turbine buckets 34 at the proper direction and at the proper velocity to drive the turbomachines or fans 30. The passages 40 can have the relatively small cross-sectional areas required to maintain the desired thin, aerodynamic shape of the rotor blades 21 while still delivering sufficient quantities of fluid to the nozzle boxes 41 since the combustion products are supplied by the gas generators 14 at relatively high pressure. Unlike certain prior art arrangements described above, the fact that the combustion products are supplied at high pressure through passages having small cross-sectional areas does not mean that the propulsion jets driving the helicopter rotor are necessarily discharged at high velocity. The reason for this will become apparent as this description proceeds.

As pointed out above, the combustion products directed to the turbine buckets 34 by the nozzle box vanes 42 drive the fan 30. Ambient air is drawn through the inlet opening 27 into the passageway 26 where it is accelerated by the compressor blades 32. The stream of combustion products is decelerated as it flows through the turbine buckets 34, its extracted energy being used to accelerate the air passing through the compressor portion of the turbomachine. The decelerated stream of combustion products leaving the turbine buckets 34 flows through a duct 43 from which it is discharged into the passageway 26. The combustion products and the accelerated air form a composite stream which is discharged through the exhaust nozzle 28 as a propulsion jet having relatively low velocity and, therefore, relatively high propulsive efficiency, the high propulsive efficiency being attained, however, without sacrifice in the thermodynamic cycle efficiency of the gas generators. As viewed in FIGS. 2 and 3, the exhaust nozzles 28 of the fan assemblies are disposed such that the propulsion jets are directed so as to drive the rotor assembly in a counterclockwise direction. The aerodynamic rotor blades 21 are, of course, positioned such that counterclockwise rotation of the blades produces lift forces for lifting the helicopter 10.

Figure 5:
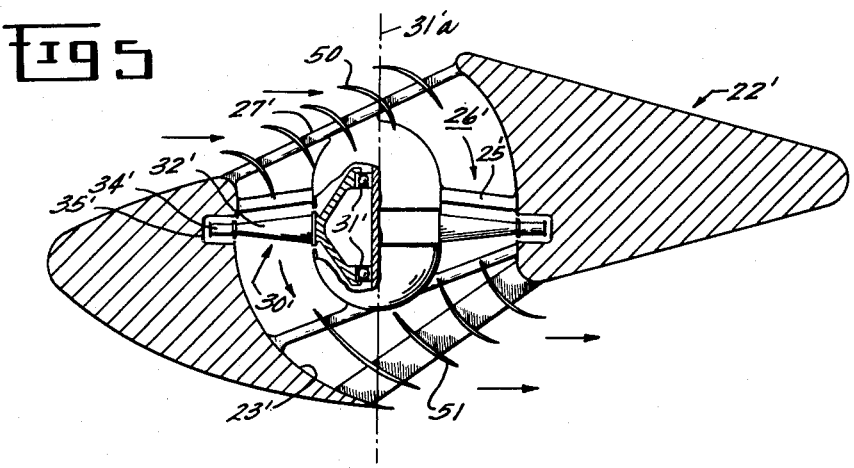
FIG. 5 is a view taken along line 5—5 of FIG. 4.

It is pointed out above that the bearings 31 are spaced as far apart as practicable in order to reduce the gyroscopic forces acting on the bearings 31. These gyroscopic forces exist since the axes 31a about which the fans 30 rotate are disposed in a common horizontal plane and are at right angles to the axis 20a of the hub 20 about which the entire rotor assembly rotates. A slightly modified arrangement in which these gyroscopic forces are essentially eliminated is illustrated by FIGS. 4 and 5, elements similar to those of FIGS. 1–3 being identified by primed numerals. As illustrated, the axes 31a of the fans 30' are vertical rather than horizontal with the compressor blades 32' and the turbine buckets 34' of the fans 30' thus being disposed in a common horizontal plane. In this modified arrangement, gyroscopic forces are substantially eliminated since all axes of rotation are parallel at all times.

In order to mount the fans 30' as shown by FIGS. 4 and 5, the air entering the passageway 26' through the inlet opening 27' must be turned through 90 degrees by means of turning vanes 50. The composite stream of accelerated air and decelerated combustion products must also be turned a similar amount by turning vanes 51. The losses thus introduced may make it undesirable to mount the fans 30' with axes 31a' vertical. It will be obvious to those skilled in the art, therefore, that it may be desirable in practice to effect a compromise in which the axes 31a' are inclined to both the horizontal and the vertical, in this manner the gyroscopic forces being held to an acceptable level without introducing excessive losses due to turning the propulsive fluids.

While fan assemblies of the "tip turbine" type only have been illustrated and described, it will be obvious to those skilled in the art that other arrangements of turbomachinery could be used. For example, an arrangement could be used in which the compressor blades are mounted on the outer tips of turbine buckets. Similarly, compressor blades and turbine buckets mounted on separate rotor wheels joined by a shaft could be used. The essence of the invention is in the combination of fan arrangements on the outer tips of helicopter rotor blades, the fans being driven by high pressure gas produced by a gas generator mounted in a fixed position within or on the fuselage and supplied to the fans through suitable ducting in the thin, aerodynamically shaped rotor blades. In this manner, it is possible to attain both high propulsive efficiency and high thermodynamic cycle efficiency without concentrating excessive weight at the outer tips of the rotor blades.

While particular embodiments of the invention have been shown and described, it will be understood that various changes and modifications may be made without departing from the spirit and scope of the invention, and it is intended to cover all such changes and modifications by the appended claim.

What is claimed as new and desired to secure by Letters Patent of the United States is:

A drive system for use in a helicopter having a fuselage and a rotor assembly comprising a plurality of substantially hollow blades mounted thereon for rotation in a horizontal plane about a vertical axis, said drive system comprising:
- a gas generator means mounted in a fixed position relative to said fuselage,
- a plurality of hollow annular casings each located at the outer tip of a respective one of said hollow rotor blades, the axes of said casings being perpendicular to the longitudinal axes of the respective rotor blades and being disposed in the horizontal plane of rotation of said rotor blades,
- an elongated hub including fixed support means concentrically supported within each of said casings and forming therewith an annular passageway,
- a plurality of axially spaced bearings mounted on said fixed support means, the axial spacing between said bearings being substantially the length of said annular passageway,
- a turbomachine rotor mounted on said axially spaced bearings for rotation about the axis of said casing,
- a row of compressor blades mounted on said rotor intermediate said bearings and extending radially outward across said passageway,
- a shroud ring circumferentially connecting the radially outer tips of said compressor blades,
- a row of turbine buckets mounted on said shroud ring and extending outwardly therefrom,
- said annular casing having an annular groove therein for receiving said turbine buckets,
- a nozzle diaphragm in said annular casing in alignment with the groove and said turbine buckets,
- a ducting system comprising in part the hollow interiors of said rotor blades interconnecting said gas generator means to the nozzle diaphragms in said plurality of annular casings for supplying gas produced by said gas generator means to said nozzle diaphragms,
- said nozzle diaphragms adapted to supply gas to the respective rows of turbine buckets at the proper angles and velocities to drive said turbomachine rotors and said rows of compressor blades,
- inlet means communicating with said annular passageways for supplying ambient air to said rows of compressor blades,
- and exhaust means communicating with said annular passageways for discharging fluid received from said rows of compressor blades and said rows of turbine buckets as propulsion jets,
- said exhaust means disposed such that the propulsion jets exhausted therefrom are in the proper direction to drive said rotor assembly and thereby produce lift forces on the helicopter.

References Cited by the Examiner

UNITED STATES PATENTS

| | | | |
|---|---|---|---|
| 2,474,359 | 6/49 | Isacco | 170—135.4 |
| 2,917,895 | 12/59 | Boushey | 170—135.4 |
| 2,941,600 | 6/60 | Koning et al. | 170—135.4 |
| 2,984,304 | 5/61 | Ranson | 170—135.4 |

FOREIGN PATENTS

| | | |
|---|---|---|
| 793,823 | 4/58 | Great Britain. |
| 883,819 | 12/61 | Great Britain. |
| 938,459 | 10/63 | Great Britain. |
| 581,243 | 8/58 | Italy. |

JULIUS E. WEST, *Primary Examiner.*